United States Patent [19]

Numata

[11] Patent Number: 4,650,928
[45] Date of Patent: Mar. 17, 1987

[54] SIGNAL TRANSMITTING AND/OR RECEIVING APPARATUS

[75] Inventor: Norio Numata, Tokyo, Japan

[73] Assignee: Sony Corporation, Tokyo, Japan

[21] Appl. No.: 742,277

[22] Filed: Jun. 7, 1985

[30] Foreign Application Priority Data

Jun. 7, 1984 [JP] Japan ............................ 59-117227

[51] Int. Cl.⁴ .......................... H04B 7/26; H04Q 7/04
[52] U.S. Cl. ...................................... 379/62; 455/58
[58] Field of Search ................ 179/2 E, 2 EA, 2 EB, 179/2.51; 370/82, 90, 95; 455/53, 54, 58

[56] References Cited

U.S. PATENT DOCUMENTS 4,332,981 6/1982 Palombi et al. .................. 179/2 EA
4,517,561 5/1985 Burke et al. ...................... 455/58 X
4,574,163 3/1986 Zato ................................. 179/2 EA

FOREIGN PATENT DOCUMENTS 69275  1/1983  European Patent Office.
74940  3/1983  European Patent Office.
106400  4/1984  European Patent Office.
2108806  5/1983  United Kingdom.
2110055  6/1983  United Kingdom.
2124454  2/1984  United Kingdom.
2144309  2/1985  United Kingdom.
WO 83/02380  7/1983  Pct Int'l Appl.

Primary Examiner—Gene Z. Rubinson
Assistant Examiner—Mark E. Ham
Attorney, Agent, or Firm—Lewis H. Eslinger; Alvin Sinderbrand

[57] ABSTRACT

A cordless telephone comprises a base unit and a plurality of remote units. The remote units are respectively adapted to establish radio communication at separate times with the base unit. Each remote unit generates a particular code in a particular format that includes at least one interval in which the particular code is present and at least one interval from which the particular code is absent. The particular code and particular format of each remote unit are different from those of the other remote units. A transmitter in each remote unit transmits the particular code of that unit in the particular format thereof to the base unit. The particular formats are such that the transmission of each particular code periodically corresponds to non-transmission of all of the other particular codes of the remote units. The particular codes can thus periodically be received by the base unit without interference caused by transmission of the other particular codes. The base unit echoes the particular code transmitted by a selected one of the remote units, and each of the remote units detects whether or not its own particular code matches the particular code echoed by the base unit. In response to such a match, a communication channel is established between the base unit and the one of the remote units in which the match occurs. The communication channel while established precludes establishment of a communication channel between the base unit and any of the other remote units.

13 Claims, 26 Drawing Figures

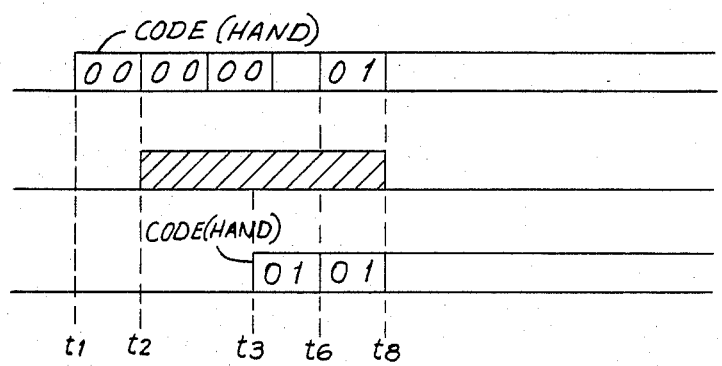
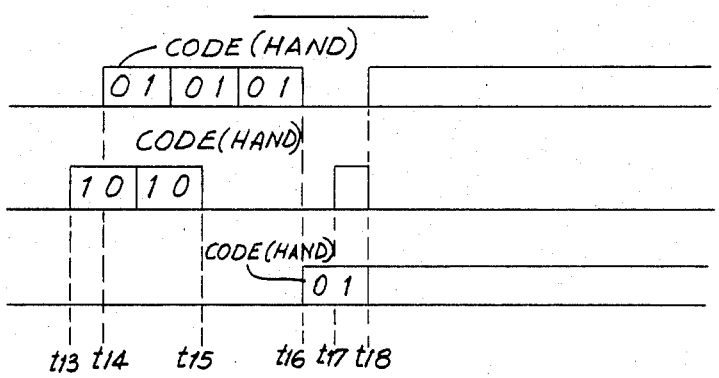
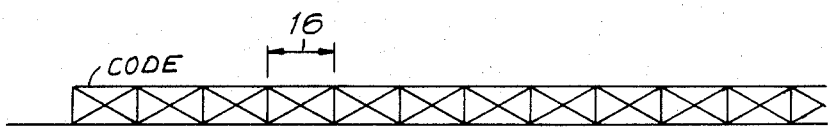
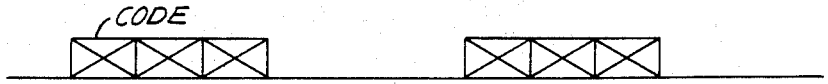

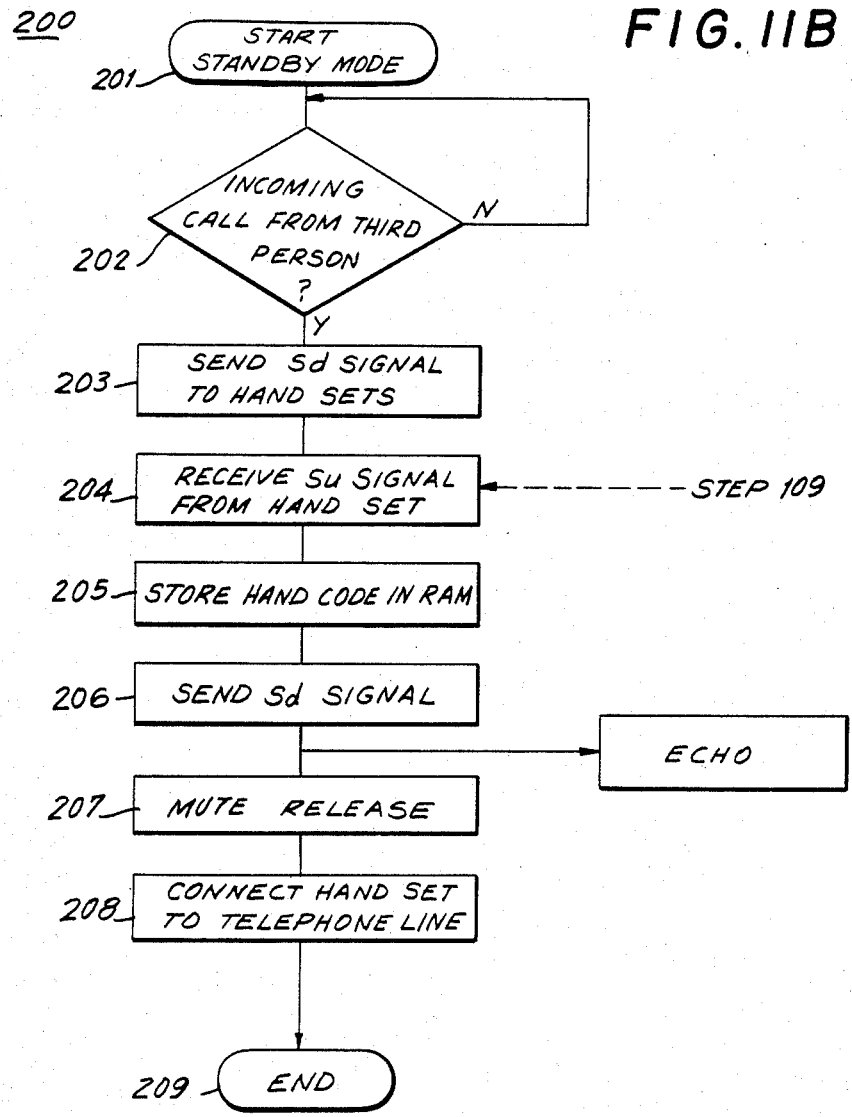

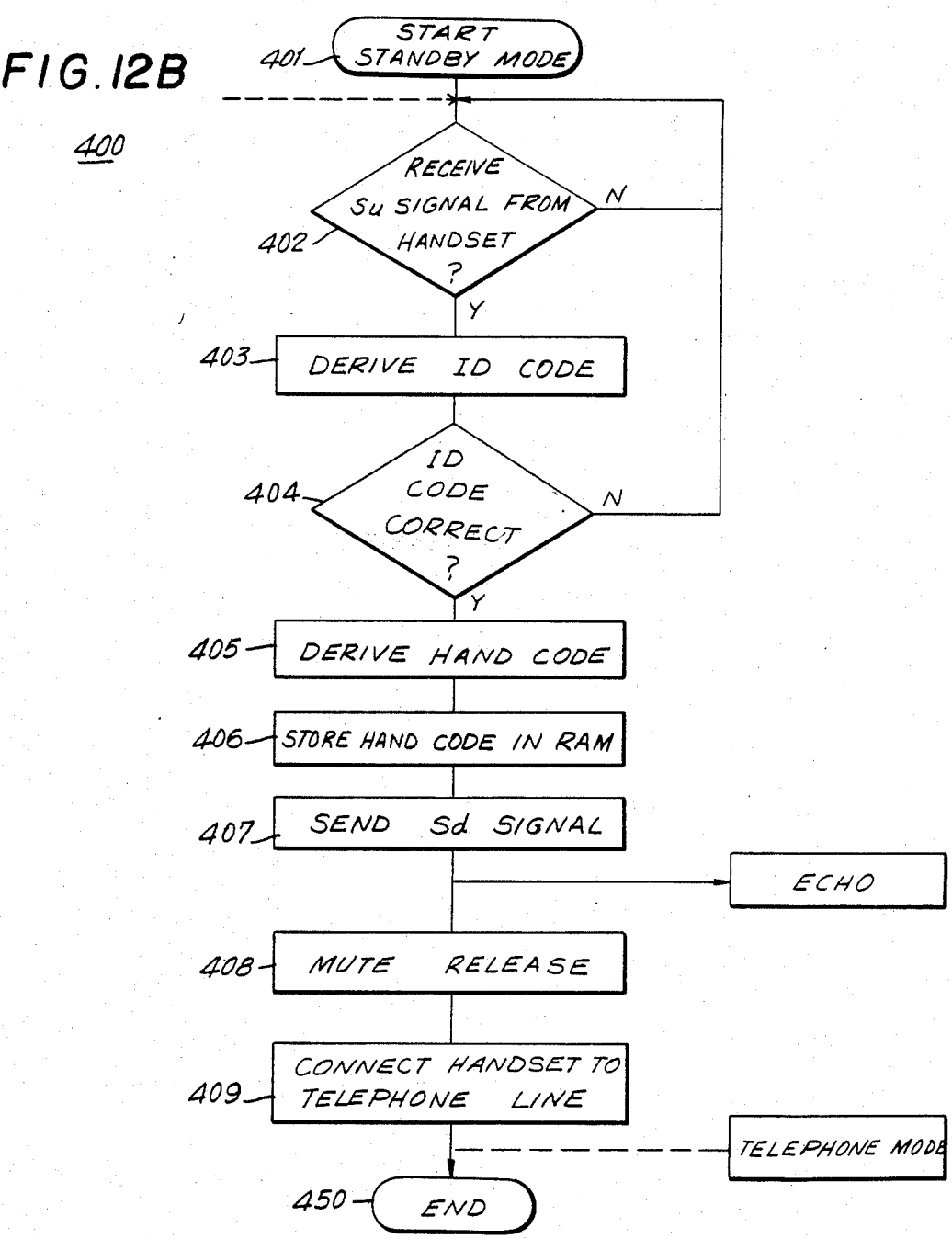

SIGNAL TRANSMITTING AND/OR RECEIVING APPARATUS

BACKGROUND OF THE INVENTION

1. Field of the Invention

This invention relates to signal transmitting and reproducing apparatus and, more particularly, to novel and highly-effective signal transmitting/reproducing apparatus of a type suitable for use as a cordless telephone and the like.

2. Description of the Prior Art

The cord of a conventional telephone is connected to a base unit that in turn is attached (rigidly or by another cord) to a post, wall or the like, so that the range of the movement permitted a user of the telephone is limited by the length of the telephone cord, for example several meters. If the telephone cord is longer than a few meters, so as to extend the range of movement permitted the user, the cord is likely to become tangled, to catch on various objects, to pull small objects from tables, to trip or inconvenience other persons in the vicinity, etc. To overcome these problems, so-called cordless telephones are becoming more frequently used in the United States and other countries.

A problem with conventional cordless telephones arises when a single base unit is used in combination with two or more handsets. In such case, a single down channel common to both handsets is used for transmission from the base unit to the handsets and a single up channel common to both handsets is used for transmission from the handsets to the base unit.

Accordingly, when the base unit calls the handsets in response to an incoming call, a telephone buzzer or similar device in each of the handsets generates an audible signal. When users of both handsets answer the call of the base unit, both handsets begin transmitting through the same up channel, which results in radio interference. In the worst case, the base unit becomes unable to receive the signal from either handset and hence no response can be made to the incoming call.

Similarly, if the handsets are used by chance in an attempt to make two outgoing calls at substantially the same time, radio interference and a service interruption result.

OBJECTS AND SUMMARY OF THE INVENTION

An object of the invention is to provide a signal transmitting and/or receiving apparatus in which, when a base unit is used with a plurality of remote units, a plurality of such remote units can be set in the talk mode simultaneously without radio interference and a selected one of them can be connected to an outside line correctly.

Another object of the invention is to provice a signal transmitting and/or receiving apparatus which can be embodied as a cordless telephone, a transceiver, a carrier system interphone, etc.

According to one aspect of the present invention, apparatus is provided comprising a base unit and a plurality of remote units, the remote units being respectively adapted to establish radio communication at separate times with the base unit; each of the remote units comprising: means for generating a particular code in a particular format that includes at least one interval in which the particular code is present and at least one interval from which the particular code is absent, the particular code and particular format of each remote unit being different from those of the other remote units of the plurality of remote units, and means for transmitting the particular code in the particular format to the base unit; the particular formats being such that the transmission of each of the particular codes periodically corresponds to non-transmission of all of the other particular codes of the plurality of remote units, whereby each of the particular codes can be periodically received by the base unit without interference caused by transmission of the other particular codes of the plurality of remote units; the base unit comprising means for echoing the particular code transmitted by a selected one of the remote units; and each of the remote units further comprising means for detecting whether or not its own particular code matches the particular code echoed by the base unit; and further comprising means responsive to such a match for establishing a communication channel between the base unit and the one of the plurality of remote units in which such match occurs, the communication channel while established precluding establishment of a communication channel between the base unit and any other of the plurality of remote units.

BRIEF DESCRIPTION OF THE DRAWINGS

A better understanding of the objects, features and advantages of the present invention can be gained from a consideration of the following detailed description of the preferred embodiment thereof, taken in conjunction with the accompanying drawings, wherein like reference characters designate like elements and parts, and wherein:

FIGS. 6A to 6C to FIGS. 10A to 10D are respectively diagrams useful for explaining the present invention;

FIGS 11A and 11B are flow charts showing the operation of the control circuit of the handsets and the base unit, respectively, in response to an incoming call; and FIGS. 12A and 12B are flow charts showing the operation of the handsets and the base unit, respectively, in response to an outgoing call.

DESCRIPTION OF THE PREFERRED EMBODIMENT

Figure 1:
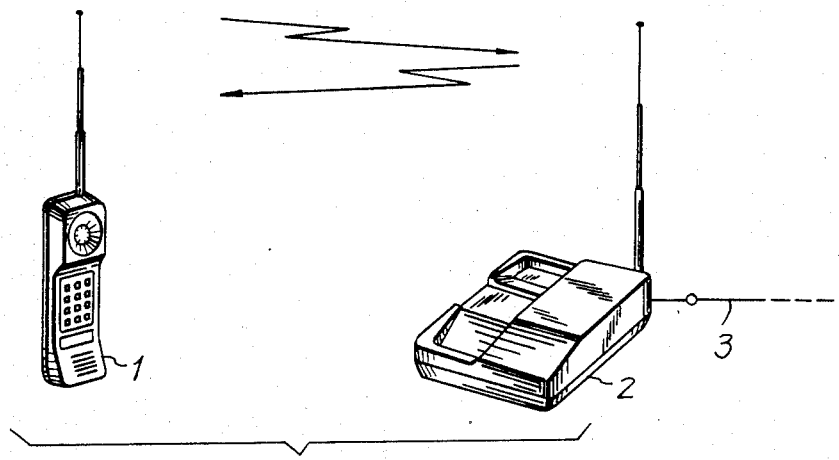
FIG. 1 is a perspective view of a representative cordless telephone system in accordance with the prior art and comprising a base unit and a handset.

Typically, as FIG. 1 shows, a conventional cordless telephone comprises a transmitter-receiver in the form of a cordless handset 1 and a transmitter-receiver in the form of a base unit 2. The base unit 2 is connected to a telephone network line 3. The handset 1 and the base unit 2 are coupled with each other through radio frequency electromagnetic waves (radio waves), and a telephone subscriber uses the handset 1 in substantially the same way as he or she would use a standard telephone. However, in using a cordless telephone, the telephone subscriber can move about freely with the handset 1 without fear of tangling a lengthy cord, etc.

The maximum useful distance between the handset 1 and the base unit 2 is referred to as the service radius and is typically about 300 meters. The frequency of the radio waves transmitted between the handset 1 and the base unit 2 is typically in, for example, the 49 MHz band for the up channel (i.e., for transmission from the handset 1 to the base unit 2) and the 46 MHz band for the down channel (i.e., for transmission from the base unit 2 to the handset 1). In most cases ten duplex channels for each system are permitted by regulations of the FCC (the Federal Communications Commission). The above-described values are of course arbitrary and from a technical standpoint can easily be varied.

Figure 2:
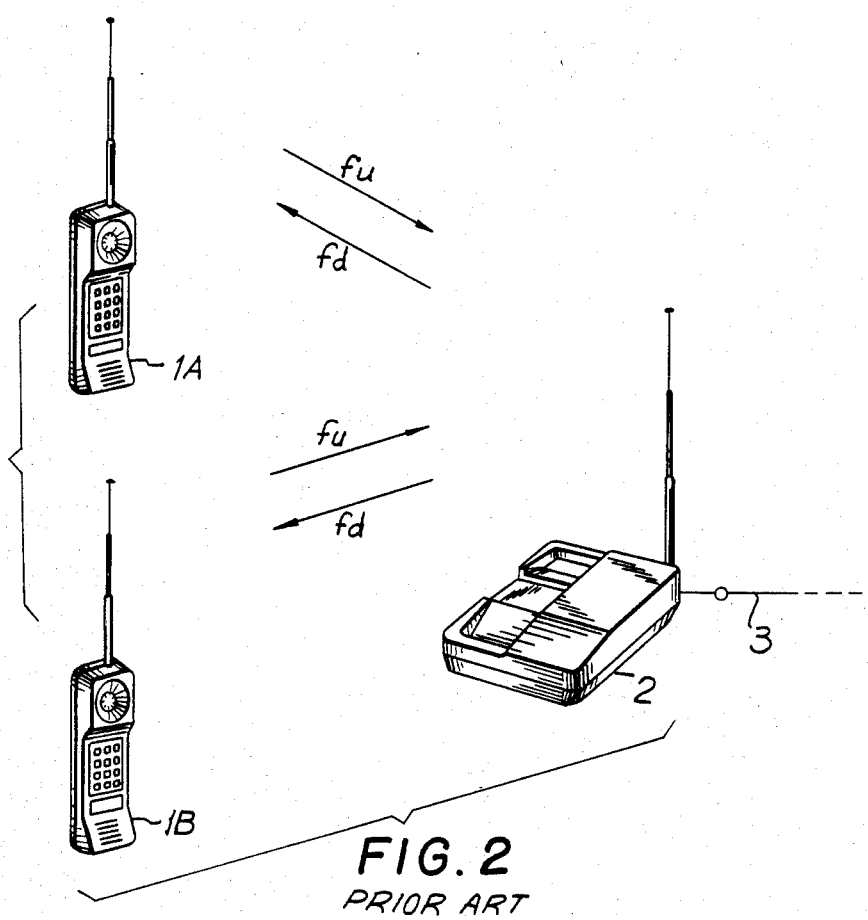
FIG. 2 is a perspective view of a representative cordless telephone system in accordance with the prior art and comprising a base unit and two handsets and to which the present invention is applicable.

A single base unit 2 is frequently combined with two handsets 1A and 1B, as FIG. 2 shows. In such case, a single down channel (having a carrier frequency fd) common to both handsets 1A and 1B is used for transmission from the base unit to the handsets, and a single up channel (having a carrier frequency fu) common to the both handsets 1A and 1B is used for transmission from the handsets to the base unit.

Accordingly, when the base unit 2 calls the handsets 1A and 1B in response to an incoming call, a telephone buzzer or similar device in each of the handsets 1A and 1B generates an audible signal. When users of both handsets 1A and 1B answer the call of the base unit 2, both handsets 1A and 1B begin transmitting through the same up channel (having the carrier frequency fu), which results in radio interference. In the worst case, the base unit 2 becomes unable to receive the signal from either handset and hence no response can be made to the incoming call.

Similarly, if the handsets 1A and 1B are used by chance in an attempt to make two outgoing calls at substantially the same time, radio interference and a service interruption result.

Figure 5:
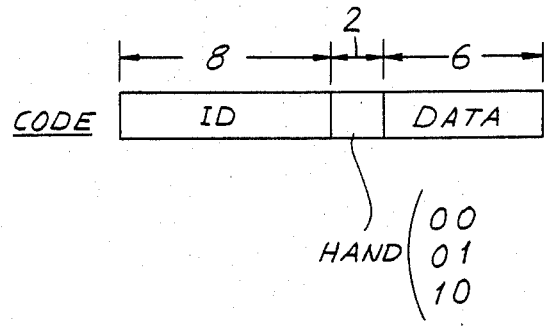
FIG. 5 is a schematic diagram of a 16-bit code signal used in the present invention.

In accordance with the invention, a code signal CODE having for example the format shown in FIG. 5 is formed. The code signal CODE is transmitted between the base unit 2 and the handsets 1A, 1B and between the handsets 1A, 1B and the base unit 2 in respective formats as shown for example in FIGS. 6A to 6C.

As FIG. 5 shows, the code signal CODE comprises a multiplicity of units each one word (16 bits) in length. Each word of the code signal CODE is formed of an identifying portion ID of 8 bits, a particular code portion HAND of 2 bits and a control portion DATA of 6 bits. The identifying portion ID is used to discriminate the combination of handsets 1A, 1B and the base unit 2 from other combinations. That is, the identifying code portion ID is selected to be common to one combination of the handsets 1A, 1B and the base unit 2, and to be a different from all other such combinations. The particular code portion HAND is used to discriminate or select the handsets 1A and 1B in accordance with the following table:

"00": code common to the handsets 1A and 1B
"01": code pertaining to the handset 1A
"10": code pertaining to the handset 1B The control portion DATA is used as a control signal to control transmission between the handsets 1A, 1B and the base unit 2.

When forming a communication channel between the handset 1A or 1B and the base unit 2, the code signals CODE are transmitted therebetween and received.

Figure 6A:
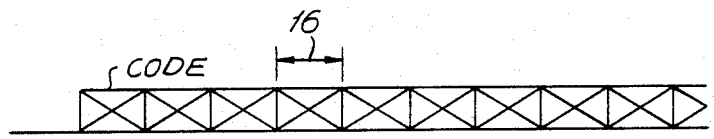
Figure 6B:
Figure 6C:
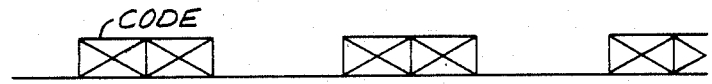

The code signal CODE is transmitted from the base unit 2 repeatedly and continuously at intervals of one word, as FIG. 6A shows. The code signal CODE is transmitted from the handset 1A continuously three times (i.e., during a period equal in length to three words), and the transmission is then interrupted for a period equal in length to two words. This cycle of operation is repeated (FIG. 6B). The code signal CODE is transmitted from the handset 1B twice continuously (i.e., during a period equal in length to two words), and the transmission is then interrupted for a period equal in length to two words. This cycle of operation is likewise repeated (FIG. 6C).

When the base unit 2 receives the code signal CODE from the handset 1A (in the form shown in FIG. 6B) or 1B (in the form shown in FIG. 6C), the base unit 2 transmits (echoes) the particular code portion HAND contained in the received code signal CODE to both handsets 1A and 1B. When the particular code portion HAND thus transmitted or echoed by the base unit 2 is not the same as its own particular code portion HAND, the handset 1A or 1B stops transmitting the code signal CODE; on the other hand, when the particular code portion HAND thus transmitted or echoed by the base unit 2 is the same as its own particular code portion HAND, the handset 1A or 1B continues the transmission to establish the communication channel.

In the following description, in cases where it is not necessary to distinguish between the handsets 1A and 1B, the handset is identified simply as the handset 1 for convenience. The handset 1 and the base unit 2 communicate with each other through a channel A or a channel B.

Figure 3:
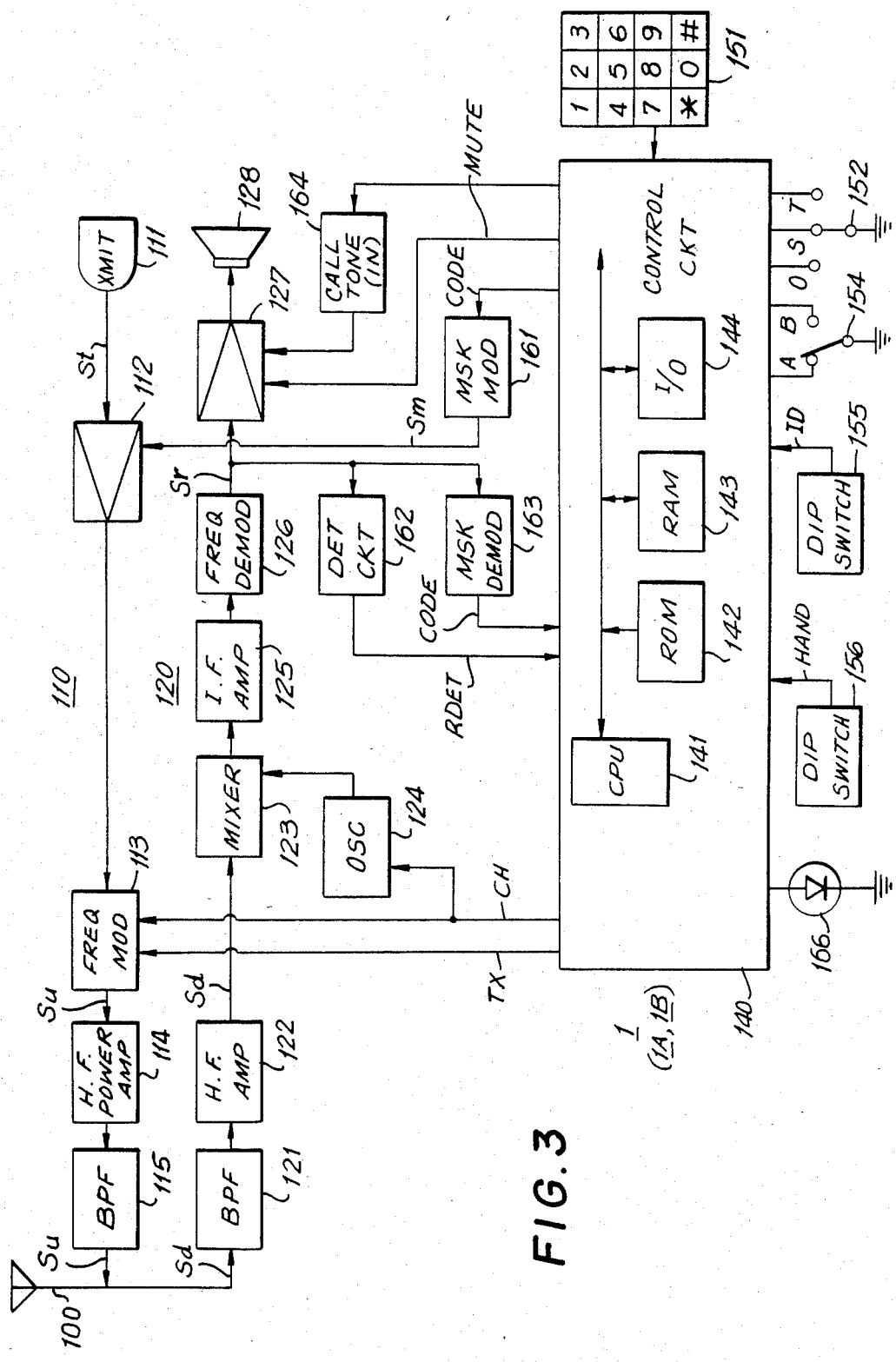
FIG. 3 is a schematic block diagram of a portion of the circuitry of the handset of the present invention.
Figure 4:
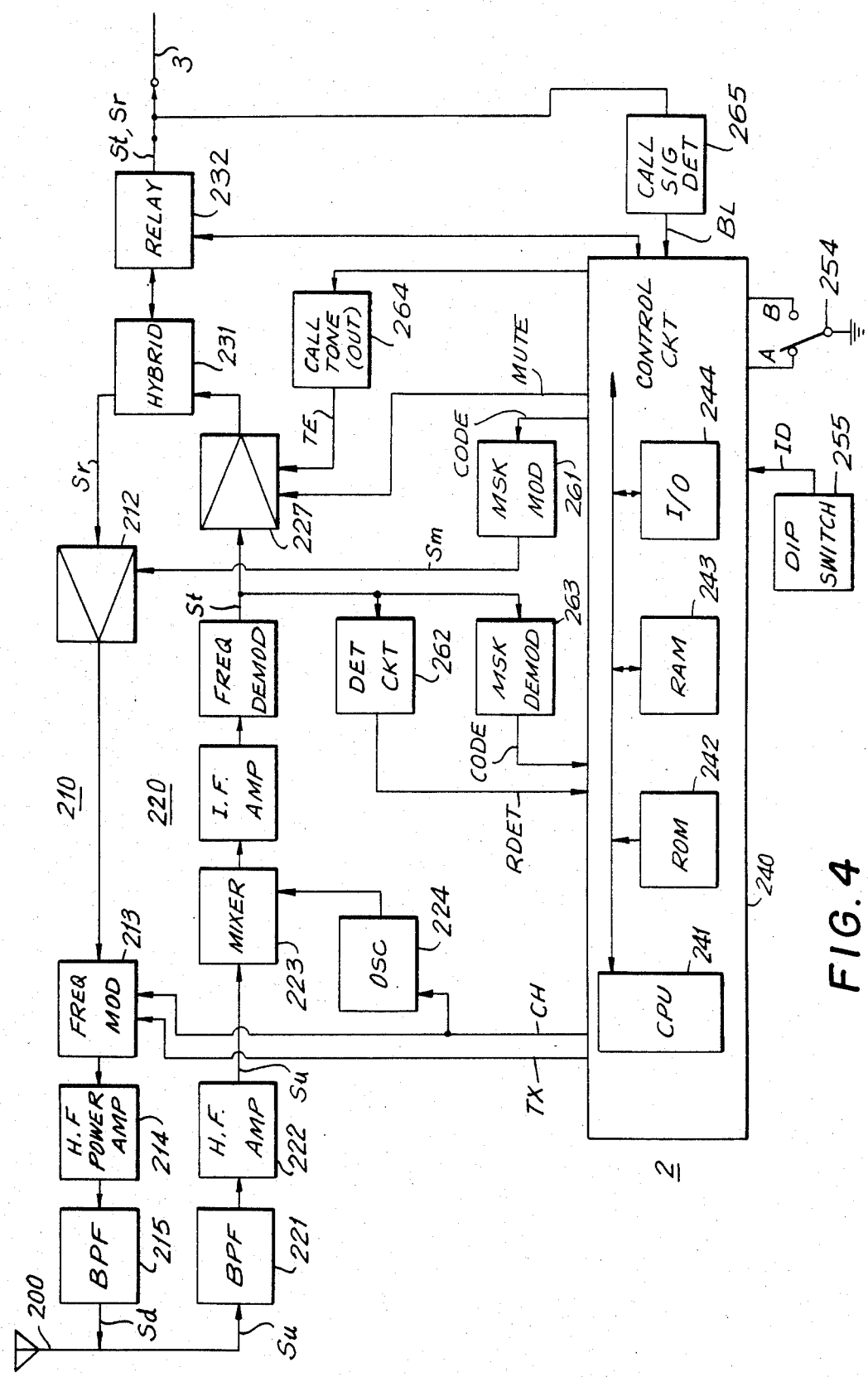
FIG. 4 is a schematic block diagram of a portion of the circuitry of the base unit of the present invention.

FIG. 3 illustrates an example of the circuitry of the handset 1, which comprises a transmitting circuit 110 and a receiving circuit 120. FIG. 4 illustrates an example of the circuitry of the base unit 2, which comprises a transmitting circuit 210 and a receiving circuit 220.

When an outgoing call is made, an audio signal St from a transmitter unit 111 in the handset 1 (FIG. 3) is supplied through an audio frequency amplifier 112 to a frequency modulator 113 which frequency-modulates the audio signal St to an FM (frequency-modulated) signal Su of the up channel A or B. (The selection of the channel A or B is made by a switch 154, as indicated below.) The FM signal Su is supplied through a high frequency power amplifier 114 and a band-pass filter 115 with a pass band that passes both up channels A and B to an antenna 100 which transmits the FM signal Su to the base unit 2.

In the base unit 2, the signal (radio wave) Su from the handset 1 is received by an antenna 200 (FIG. 4). The received signal Su is supplied through a band-pass filter 221 with a pass band that passes both up channels and through a high frequency amplifier 222 to a mixer circuit 223. The mixer circuit is supplied also with an oscillating signal of a predetermined frequency from a local oscillating circuit 224. The signal Su is thus converted to an intermediate frequency signal. The intermediate frequency signal is supplied through an intermediate frequency amplifier 225 to a frequency demodulating circuit 226 which demodulates the intermediate frequency input thereto and produces the audio signal St. The signal St is delivered through a signal transmission line comprising an audio frequency amplifier 227, a hybrid circuit 231 and relay means 232 to the telephone network line 3.

The relay means 232 includes an ON/OFF relay circuit for carrying out the ON and OFF functions between the base unit 2 and the telephone network line 3, a hold relay circuit, etc. (not shown). The hold relay circuit is used when the base unit 2 and the telephone network line 3 are connected with each other and then the telephone conversation is temporarily interrupted. In such a case, the hold relay circuit maintains the connection between the base unit 2 and the telephone network line 3.

Upon receiving an incoming call, an audio signal Sr (FIGS. 3 and 4) from the telephone network line 3 (FIG. 4) is supplied to a receiver or speaker 128 (FIG. 3) of the handset 1. More particularly, the audio signal Sr from the telephone network line 3 is supplied through the signal transmission line of the relay circuit 232, the hybrid circuit 231 and an audio frequency amplifier 212 to a frequency modulating circuit 213 which modulates the audio signal Sr to an FM (frequency-modulated) signal Sd. The signal Sd is supplied through a high frequency power amplifier 214 and through a band-pass filter 215 to the antenna 200, which then transmits the FM signal Sd to the handset 1.

In the handset 1 (FIG. 3), the signal Sd from the base unit 2 is received by the antenna 100. The received signal Sd is supplied through a band-pass filter 121 and through a high frequency amplifier 122 to a mixer circuit 123. The mixer circuit 123 is supplied also with an oscillating signal having a predetermined frequency from a local oscillating circuit 124. The signal Sd is thus converted to an intermediate frequency signal. The intermediate frequency signal is supplied through an intermediate frequency amplifier 125 to a frequency demodulating circuit 126 which demodulates the intermediate frequency input thereto and produces the audio signal Sr. The audio signal Sr is supplied through an audio frequency amplifier 127 to the receiver or speaker 128.

A control circuit 140 (FIG. 3) may comprise for example a one-chip microcomputer MSM-6404 manufactured by Oki Electric Industry Co., Ltd., of Japan. The circuit 140 includes a 4-bit CPU (central processing unit) 141 for parallel processing, a ROM (read only memory) 142 in which a control program is stored, a RAM (random access memory) 143 for the work area and an I/O port 144.

The microcomputer 140 is connected with a keyboard 151, a talk switch 152, a channel switch 154 and dip switches 155 and 156. The keyboard 151 comprises non-lock push switches for input of the telephone number of a third person to be called. This number is supplied to the control circuit 140. The talk switch 152 is a changeover switch having three fixed contacts O, S and T for selection of the operation mode of the handset 1. When the movable contact of the talk switch 152 is connected to the contact O, the power supply to all of the circuits except the microcomputer 140 is turned off (off-mode). When the movable contact of the talk switch 152 is connected to the contact S, the handset 1 is placed in the mode (standby mode) to receive the signal Sd from the base unit 2. When the movable contact of the talk switch 152 is connected to the contact T, the handset 1 is placed in the mode (talk mode) for voice communication with the base unit 2. The movable contact of the talk switch 152 is normally connected with the standby contact S.

Figure 7A:
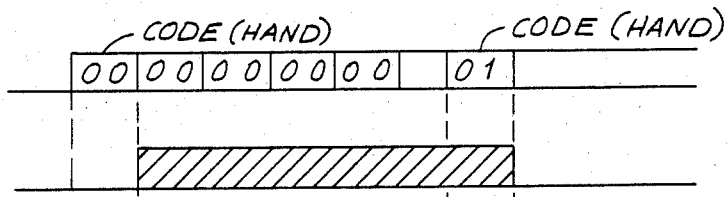

The channel switch 154 is the changeover switch that changes the communication channel between the handset 1 and the base unit 2 to either channel A or B. The switch 155 is adapted to supply the identifying code ID (FIG. 5) to the microcomputer 140. The switch 156 is adapted to supply the particular code HAND (FIG. 5) to the microcomputer 140. In the handset 1A, "01" is produced from the switch 156 as the code HAND (FIG. 7C), while in the handset 1B, "10" is produced from the switch 156 as the code HAND (FIG. 7D). The outputs from these keys and switches 151 to 156 are all supplied to the microcomputer 140, as indicated above.

An MSK (minimum shift keying) modulating circuit 161 is adapted to convert the code signal CODE supplied from the microcomputer 140 in the form of a binary signal to an MSK signal Sm in an audio frequency band. The MSK signal Sm from the MSK modulating circuit 161 is supplied to the amplifier 112.

A reception detecting circuit 162 is connected to the demodulating circuit 126 and detects whether or not the signal Sd exists by utilizing the fact that the frequency component of the output from the demodulating circuit 126 becomes different in accordance with the presence or absence of the signal Sd. Its detected signal RDET is supplied to the microcomputer 140.

An MSK demodulating circuit 163 is connected to the demodulating circuit 126 and demodulates the original code signal CODE from the MSK signal Sm sent from the base unit 2. The demodulated code signal CODE is supplied to the microcomputer 140.

A call tone forming circuit 164 is controlled by the microcomputer 140 so as to from a bell sound signal (ring tone signal) when an incoming call is received. The bell sound signal is supplied to the amplifier 127.

An LED (light emitting diode) 166 connected to the microcomputer 140 serves as a busy lamp. When a user attempts to use one of the handsets 1A or 1B to make an outgoing call and the communication channel has already been occupied by the other handset 1B or 1A, the LED 166 blinks.

The microcomputer 140 supplies a channel designating signal CH to the modulating circuit 113 and the local oscillating circuit 124 and also supplies a control signal TX to the modulator circuit 113, by which the modulating circuit 113 is controlled to deliver or not to deliver the FM signal Su therefrom. Also, the microcomputer 140 supplies a muting signal MUTE to the amplifier 127.

As FIG. 4 shows, the base unit 2 includes a control circuit 240. The control circuit 240 is similar in structure and function to the control circuit 140 of the handset 1. The circuit elements of the control circuit 240 corresponding to the circuits 141 to 144 of the control circuit 140 are represented with corresponding reference numbers, but in the 200s instead of the 100s. Since these circuit elements have been explained above, no further explanation thereof is required.

Switches 254 and 255 and circuits 261 to 264 in the base unit 2 are respectively similar to the switches 154 and 155 and the circuits 161 to 164 of the handset 1, and the relevant signals thereof are also similar; thus they require no further explanation. Particularly, the call tone circuit 264 is adapted to form a tone encode signal TE which corresponds to the telephone number of a third person to be called.

An audible or calling signal detecting circuit 265 is provided which is connected to the telephone network line 3 and detects the audible ringing signal of the incoming call. Its output signal BL is supplied to the microcomputer 240. Between the relay circuit 232 and the microcomputer 240, there is provided a two-way control signal line 232a.

When an incoming call is made by a third person, the microcomputers 140 and 240 carry out the following operations in accordance with the control programs stored in the ROMs 142 and 242.

When an incoming call from a third person is made at an arbitrary time $t_1$ (FIGS. 7A through 7D), the bell sound signal BL is produced by the detecting circuit 265 (FIG. 4) and supplied to the microcomputer 240 so that the modulating circuit 213 is enabled by the signal TX to generate the FM signal Sd, and the code signal CODE is formed by the microcomputer 240. The code signal CODE is supplied to the modulating circuit 261. The circuit 261 generates the signal Sm, which is transmitted through the amplifier 212 on the signal Sd.

The identifying code ID contained in the transmitted code signal CODE is produced by the switch 255, the particular code HAND is represented as "00" in order to specify both the handsets 1A and 1B, and the data code DATA is the code indicative of the presence of the incoming call. As FIG. 7A shows, the signal CODE is continuously transmitted at every one-word interval repeatedly from the time $t_1$. In FIGS. 7A to 7D (and elsewhere in the drawings), "00", "01" and "10" in the code signal CODE represent the respective values of the transmitted codes HAND.

In the handset 1 (FIG. 3), the movable contact of the talk switch 152 is normally connected to the standby contact S. When the signal Sd is received by the handset 1, the detecting signal RDET indicating reception of the signal Sd is derived from the detecting circuit 162 so that the microcomputer 140 is placed in the mode to check the identifying code ID contained in the succeeding code signal CODE. When the signal Sm is generated by the demodulating circuit 126 and the first word of the code signal CODE is produced by the demodulating circuit 163, the microcomputer 140 checks whether or not the identifying code ID obtained in the code signal CODE matches the identifying code ID set by the switch 155. If not (i.e., if the call emanates from the base unit 2 of another telephone subscriber), the microcomputer 140 does not carry out the succeeding signal processing but remains in the standby mode. If the identifying code ID contained in the code signal CODE matches the identifying code ID set by the switch 155, the particular code HAND is checked. In the case of an incoming call, HAND="00" is initially established. This means that both handsets 1A and 1B are specified so that the call tone forming circuits 164 of the both handsets 1A and 1B form the bell sound signal. This signal is supplied through the amplifier 127 to the speaker 128.

Figure 7B:

As FIG. 7B shows, time $t_2$ follows time $t_1$ by one word period of the code signal CODE. At time $t_2$, the bell sound is produced by both the handsets 1A and 1B to announce the arrival of the incoming call (FIG. 7B).

Figure 7C:
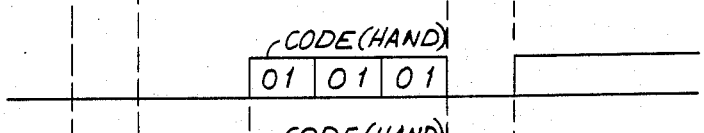
Figure 7D:
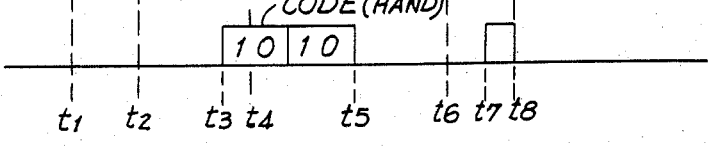

In the following description, it is assumed that the handsets 1B and 1A respectively respond to the incoming call at times $t_3$ and $t_4$. That is, the talk switch 152 is changed in position to the talk contact T at time $t_3$ in the handset 1B (FIG. 7D) and at time $t_4$ in the handset 1A (FIG. 7C). In the handset 1B, in response to the movement of the talk switch 152 to the talk contact T, the signal TX from the microprocessor 140 enables the modulating circuit 113 to generate the FM signal Su, and the code signal CODE is generated by the microcomputer 140. The code signal CODE is converted to the signal Sm by the modulator 161 and then transmitted on the signal Su.

The identifying code ID in the code signal CODE transmitted by the handset 1B is derived from the switch 155, and the particular code HAND is derived from the switch 156. The value of the code HAND that indicates transmission from the handset 1B is "10". The data signal DATA indicates the response to the reception. As indicated in FIG. 6C, the code signal CODE is transmitted by the handset 1B in two successive word periods beginning at time $t_3$ (FIG. 7D) and then the transmission is interrupted during two successive word periods. This cycle of alternate transmission and interruption thereof is repeated. When the second code signal CODE is ended at time $t_5$ (FIG. 7D), the transmission of the signal Su is stopped by the signal TX. Then, at a time $t_7$ with a delay of two word periods after the time $t_5$, the transmission of the signal Su is once again enabled by the signal TX and hence the signal CODE is transmitted.

If the talk switch 152 in the handset 1A is changed in position to the talk contact T at time $t_4$ (shortly after the time $t_3$), signal processing exactly same as in the handset 1B is carried out. As FIG. 7C shows, the code signal CODE is transmitted from time $t_4$. However, in the code signal CODE transmitted by handset 1A, the value of the particular code HAND is presented as "01" by the switch 156 (FIG. 3). As FIG. 6B shows, the transmission of the code signal CODE from the handset 1A is such that the transmission of three word periods from the time $t_4$ is performed and then there is a transmission interruption of two word periods. This cycle of alternate transmission and interruption thereof is repeated.

Since signals Su and Su are simultaneously transmitted from both handsets 1A and 1B during the period $t_4$ to $t_5$, as FIGS. 7C and 7D show, if the levels of reception of the signals Su and Su are nearly the same in the base unit 2, radio interference occurs and the base unit 2 can not correctly receive the two signals Su and Su.

However, at time $t_5$, the transmission of the signal Su from the handset 1B is interrupted over a period of two word periods up to time $t_7$, so that from time $t_5$, the base unit 2 becomes able to receive clearly, and without radio interference, the signal Su from the handset 1A.

Since the detection signal RDET of the signal Su is produced by the detecting circuit 262 in the base unit 2 (FIG. 4), the microcomputer 240 is set in the state to check the succeeding code signal CODE. In FIG. 7, one full word of the code signal CODE has been received without interference by time $t_6$. At that time, the microcomputer 240 checks whether or not the identifying code ID in the code signal CODE matches the identifying code ID set in the switch 255. If they do not match (i.e., the identifying code ID is sent from the handset 1 of another telephone subscriber), the microcomputer 240 does not carry out the succeeding signal processing but is placed in the standby mode. If they do match, the particular code HAND contained in the code signal CODE is checked. In this case, HAND="01" is established and specifies the handset 1A. The base unit 2 transmits (echoes) once the code signal CODE in which HAND="01" is established, during the period $t_6$ to $t_8$, as FIG. 7A shows.

Then, the code signal CODE in which HAND="01" is established is received by both handsets 1A and 1B, so that, at time $t_8$, the code HAND is produced in both handsets 1A and 1B. The codes HAND are respectively checked by the handsets 1A and 1B. As a result of the checking, in the handset 1A, HAND="01" is found to match the particular code HAND set in the switch 156 so that the forming circuit 164 stops forming the bell sound signal. As shown in FIG. 7B, the bell sound is terminated at time $t_8$. The amplifier 127 is then released from muting by the signal MUTE.

In the handset 1B, as a result of the checking, HAND="01" is found not to match the particular code HAND (="10") set in the switch 156. As FIG. 7B shows, the bell sound is terminated in the handset 1B also. At the same time, the transmission of the signal Su is terminated in the handset 1B, a communication channel having been established between the handset 1A and the base 2.

In the base unit 2, when the transmission of the code signal CODE is ended at time $t_8$, the amplifier 227 is released from muting by the signal MUTE.

Accordingly, after the time $t_8$, only the handset 1A carries out transmission so that, after time $t_8$, the communication channel between the handset 1A and the base unit 2 is normally established, and the handset 1A can respond to the incoming call and telephone communication can be made as disclosed above.

In the handset 1B, the transmission of the signal Su is terminated at time $t_8$, and the LED 166 begins to blink, whereby to announce to the user of the handset 1B that the communication channel with the base unit 2 is occupied by the handset 1A. When the connection with the outside line is terminated in the handset 1A, the transmission of the signal Sd in the base unit 2 is stopped and this is detected by the signal RDET in the handset 1B. The LED 166 then stops blinking to announce that the communication channel with the base unit 2 is no longer occupied.

When the handsets 1B and 1A respond to the incoming call at times $t_3$ and $t_4$ as shown in FIG. 7, the handset 1A receives the incoming call.

If only the handset 1A responds to the incoming call (say at time $t_3$), or if both handsets 1A and 1B respond to the incoming call but the radio wave of the handset 1B is too weak to cause radio interference, thus, as FIG. 8 shows, the code signal CODE from the handset 1A is produed from time $t_6$ so that, from time $t_6$, the code signal CODE, specifying the handset 1A, is transmitted. This establishes the communication channel between the handset 1A and the base unit 2 from time $t_8$.

If only the handset 1B responds to the incoming call or if both handsets 1A and 1B respond to the incoming call but the radio wave of the handset 1A is too weak to cause radio interference, then the communication channel between the handset 1B and the base unit 2 can be established similarly.

When an outgoing call is made by the handset 1, the following operation is carried out. In the following discussion, it is assumed that, in the handsets 1A and 1B, the talk switches 152 are changed in position to the talk contacts T at times $t_{14}$ and $t_{13}$, respectively (FIG. 9). Then, in the handset 1A, since the switch 152 is connected to the contact T at time $t_{14}$, on the basis of the output therefrom, the modulating circuit 113 is enabled by the signal TX to transmit the FM signal Su. Subsequently, the codes ID and HAND are respectively produced from the switches 155 and 156 so that the code signal CODE containing these codes ID and HAND is transmitted on the signal Su from time $t_{14}$ as shown in FIG. 9A.

Also in the handset 1B, since the talk switch 152 is connected to the talk contact T at time $t_{13}$, the code signal CODE is similarly transmitted on the signal Su from time $t_{13}$.

Accordingly, as FIGS. 9A and 9B show, during the period $t_{14}$ to $t_{15}$, the signals Su and Su are simultaneously transmitted from the handsets 1A and 1B so that, in the base unit 2, if the reception levels of the signals Su and Su are nearly the same, radio interference occurs. Thus the base unit 2 cannot correctly receive either of the signals Su and Su.

However, from time $t_{15}$, when the transmission of the signal Su from the handset 1B is interrupted, the base unit 2 becomes able to receive the signal Su from the handset 1A without interference.

Consequently, during the period $t_{15}$ to $t_{18}$, an operation similar to that performed during the period $t_5$ to $t_8$ is carried out. More particular, the base unit 2 transmits the code signal CODE indicative of the code HAND (="01") specifying the handset 1A from time $t_{16}$ as shown in FIG. 9C, whereby to establish the communication channel between the handset 1A and the base unit 2 beginning at time $t_{18}$. The amplifiers 127 and 227 in the handset 1A and the base unit 2 are at the same time released from muting.

Subsequently, when the keyboard 151 is employed in order to key in the telephone number of a third person to be called on the handset 1A, the microcomputer 140 generates the code signal CODE containing the corresponding dial signal as the data signal DATA. The code signal CODE is converted to the MSK signal Sm by the modulating circuit 161 and then transmitted to the base unit 2. At this time, the LED 166 of the handset 1B is caused to begin to blink, thus indicating to a user of the handset 1B that the communication channel with the base unit 2 is occupied or busy.

In the base unit 2, the demodulating circuit 263 produces the code signal CODE. On the basis of the data signal DATA of the code signal CODE, the forming circuit 264 is controlled by the microcomputer 240 so as to form the tone encode signal TE corresponding to the telephone number of the third person to be called. The tone encode signal TE is supplied through the amplifier 227, the hybrid circuit 231 and the relay circuit 232 to the telephone network line 3. Accordingly, the third person is called. If the third person responds to the call, telephone communication is established as disclosed above.

When an outgoing call is made from either of the handsets 1A and 1B or even when an outgoing call is made from the both handsets 1A and 1B but the radio wave of one of them is too weak to cause radio interference, the code HAND specifying the handset from which the outgoing call is made is transmitted from the base unit 2 thereby to establish a communication channel between the base unit 2 and such handset.

After the communication channel is established between the handsets (for example the handset 1A) and the base unit 2, if the talk switch 152 of the other handset (for example the handset 1B) is connected to the talk contact T in order to make an outgoing call, the second outgoing call cannot be completed since the communication channel has already been established between the handset 1A and the base unit 2. Thus even if the code signal CODE is transmitted from the handset 1B, the responsive code signal CODE is not transmitted from the base unit 2 and in the handset 1B the detected signal RDET indicating reception of the signal from the base unit 2 is not obtained. Thus, the microcomputer 140 in the handset 1B judges that the communication channel is occupied by the handset 1A, and the LED 166 of the handset 1B begins to blink to announce that the communication channel is occupied.

Figure 11A:
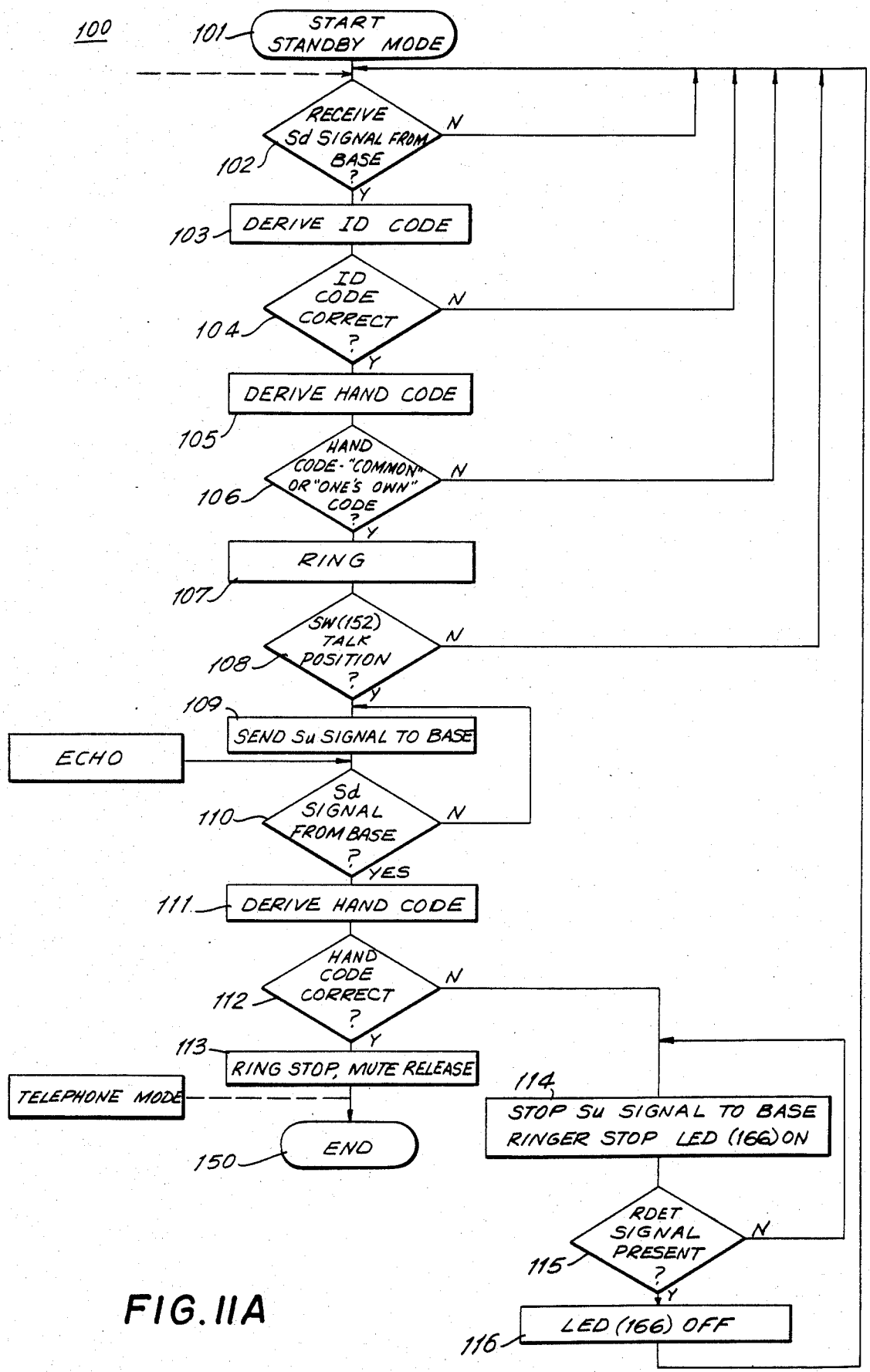

FIGS. 11A and 11B are flow charts showing the operation of the control circuit 140 of the handsets 1A and 1B and of the control circuit 240 of the base unit 2 in response to an incoming call.

In FIG. 11A, position 101 of a program 100 represents the program start, in which the handset is in the standby mode. At step 102, a check is made to determine whether or not the signal Sd has been received from the base unit 2. (Compare step 203 in FIG. 11B.) If not, the program loops back so that the check is made repeatedly. When the signal Sd is received, the ID code is derived in step 103, and, in step 104, a check is made to determine whether or not the ID code matches that representing the combination of the base unit 2 and the handsets 1A and 1B. If not, the program loops back to step 102. If a match is found, the HAND code is derived at step 105, and, at step 106, a determination is made whether or not the HAND code is common to both handsets (00) or proper to the handset in which the program is being carried out. If neither match is found, the program loops back to step 102. If the HAND code is common to both handsets or proper to the handset in which the program is being carried out, the ringing signal is established at step 107, and, at step 108, a determination is made whether or not the switch 152 has been placed in the talk position. If not, the program loops back to step 102. If the determination made at step 108 is that the switch 152 has been placed in the talk position, the signal Su is transmitted to the base 2 at step 109.

At step 110, a determination is made whether the signal Sd has been echoed by the base. (Compare step 206 in FIG. 11B.) If not, the program loops back to step 109, and the signal Su continues to be transmitted. If the signal Sd is found at step 110 to have been echoed by the base, the HAND code is derived at step 111, and, at step 112, a determination is made whether or not the HAND code is proper to the handset in which the program is being carried out. If not, the handset stops transmitting the signal Su to the base, the ringing signal stops, and the LED 166 is lighted at step 114. At step 115, a determination is made whether the RDET signal is present. If not, the program loops back to step 114. If it is present, the LED 166 is turned off, and the program loops back to step 102.

If at step 112 the code HAND is found to be correct, i.e., is found to match the code HAND in which the program is being carried out, the ringing signal stops and the mute is released at step 113, and the telephone mode is established. The program end is indicated at 150.

In FIG. 11B, position 201 of a program 200 represents the program start, in which the base unit 2 is in the standby mode. The program repeatedly checks at step 202 for an incoming call from a third person. As long as no such call is received the program loops back. If an incoming call is received from a third person, the signal Sd is transmitted to both handsets 1A, 1B at step 203. When, as a result of step 109 of FIG. 11A the signal Su is transmitted to the base unit 2, the signal Su is received by the base unit at step 204. At step 205, the code HAND is stored in the RAM 243. At step 206, the base unit 2 transmits (echoes) the signal Sd. This is detected at step 110 in FIG. 11A. At step 207, the mute is released, and at step 208, the handset is connected to the telephone line. The program end is indicated at 209.

Figure 12A:
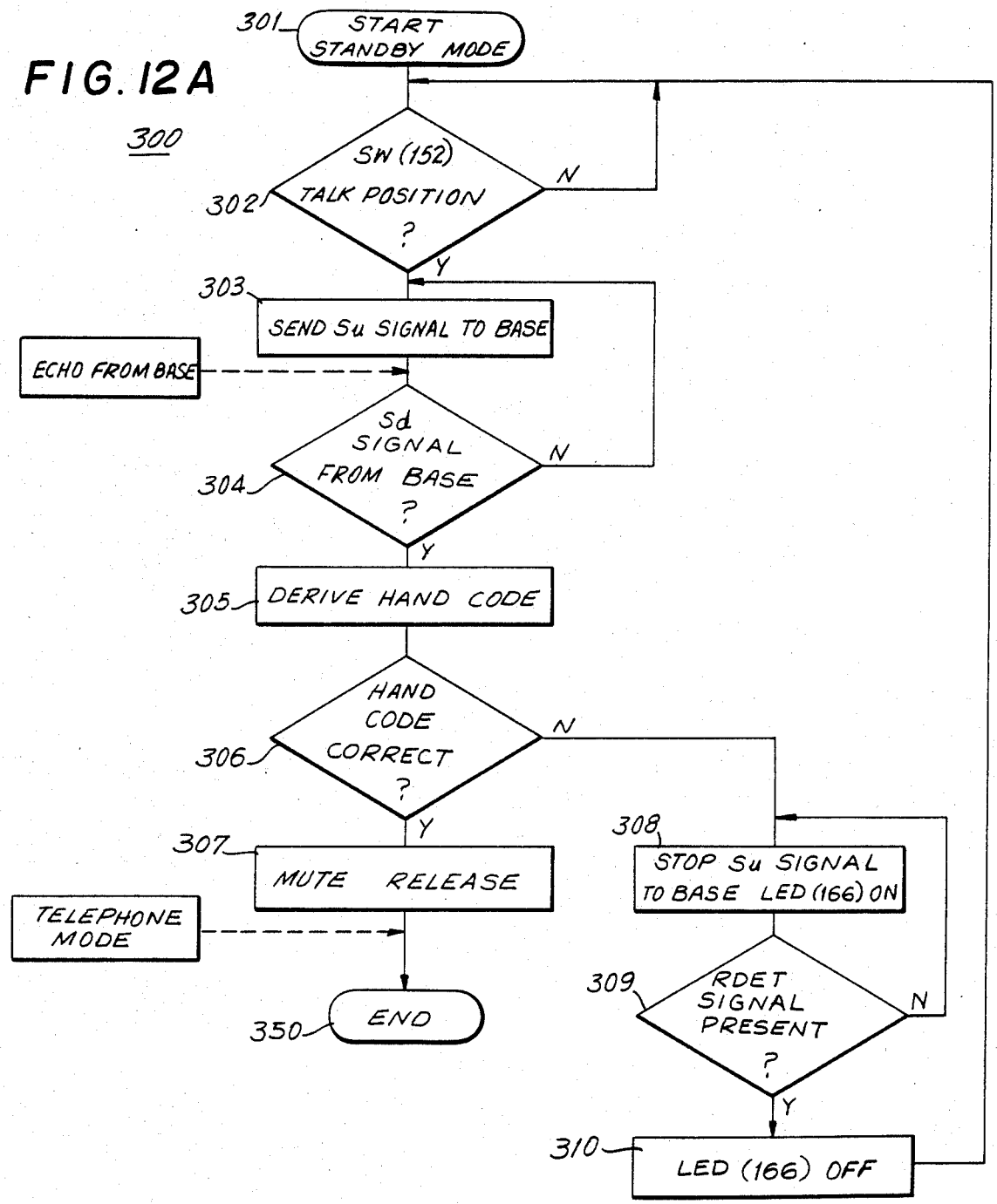

In FIG. 12A, position 301 of a program 300 represents the program start, in which the handset 1 is in the standby mode. The program checks at step 302 whether or not the switch 152 has been placed in the talk position. If not, the program continually loops back. If at step 302 the switch 152 is found to have been placed in the talk position, then, at step 303 the signal Su is transmitted to the base unit 2. At step 304, a determination is made whether or not the signal Sd has been received from the base 2. If not, the program loops back to step 303, and the signal Su is retransmitted. If the signal Sd (echo) from the base 2 is detected at step 304, the HAND code is derived at step 305. At step 306, a determination is made whether or not the HAND code is correct. If it is incorrect, then, at step 308, the handset stops transmitting the signal Su to the base 2, and the LED 166 is turned on. Then, at step 309, a check is made for the existence of the RDET signal. If it is not found, the program loops back to step 308. If it is found, the LED 166 is turned off, and the program loops back to step 302.

If at step 306 the HAND code is found to be correct, the mute is released at step 307, and the telephone mode is established. This brings the program to the end 350.

Before an outgoing call is made by the handset 1, the base unit 2 is initially in the program start position or standby mode 401 of a program 400 (FIG. 12B). At step 402, a determination is made whether the signal Su has been received from the handset. (Compare step 303 in FIG. 12A.) If not, the program loops back. When the signal Su is transmitted (step 303 of FIG. 12A), the check performed at step 402 results in a determination that the signal has been received. The ID code is then derived at step 403. At step 404, a determination is made whether or not the ID code is correct. If not, the program loops back to step 402. If the ID code is correct, the HAND code is derived at step 405 and stored in the RAM 243 at step 406. The signal Sd is transmitted at step 407 (echo). The mute is released at step 408, and the handset is connected to the telephone line 3 to establish the telephone mode at step 409. This brings the program to the program end 450.

Thus, according to the invention, when the base unit 2 is used in combination with two handsets 1A and 1B, either of the handsets 1A and 1B can correctly receive an incoming call or place an outgoing call. Even if an attempt is made to use both of the handsets 1A and 1B simultaneously, one will be will selected and will establish a communication channel with the outside line 3 without radio interference from the other.

While in the above-described embodiment the base unit 2 is used in combination with two handsets 1A and 1B, three or more handsets may optionally be used in combination with a single base unit. In the case of three handsets 1A, 1B and 1C, the particular code HAND of two bits of the code signal CODE as shown in FIG. 5 is "00": code common to handsets 1A, 1B and 1C
"01": code pertaining to the handset 1A
"10": code pertaining to the handset 1B
"11": code pertaining to the handset 1C In this case, the code signal CODE is repeatedly transmitted from the base unit 2 at one word intervals as shown in FIG. 10A. The code signal CODE is transmitted from the handset 1A as shown in FIG. 10B. That is, it is continuously transmitted four times (four words), and the transmission thereof is interrupted for an interval of three words. This operation is repeated. The code signal CODE is transmitted from the handset 1B as shown in FIG. 10C. That is, it is transmitted continuously three times and then interrupted for an interval of three words, and this operation is repeated. The code signal CODE is transmitted from the handset 1C as shown in FIG. 10D. That it, it is continuously transmitted twice, and then the transmission thereof is interrupted for an interval of three words. This operation is repeated. Thus, the three handsets 1A, 1B and 1C can be used in a manner similar to the manner in which the two handsets 1A and 1B are used. Of course, if more that four handsets 1 are used, the number of bits in the code signal HAND is increased, and the format of FIG. 5 is changed correspondingly. Upon transmission by the handset 1, the code signal CODE is transmitted continuously a predetermined number of times and the transmission thereof is interrupted during an interval corresponding to the above-described predetermined time. The format is such that the transmission of each of the particular codes periodically corresponds to non-transmission of all of the other particular codes of the remote units, whereby each of the particular codes can periodically be received by the base unit 2 without interference caused by transmission of the other particular codes of the remote units.

The operation of the circuits 161 to 163 and 261 to 263 (as well as the circuits 140 and 240) can be realized by software. Further, the telephone number of a third person can be delivered as a dial pulse.

If the transmitter-receiver is of a carrier wave type in which a single base unit is employed with a plurality of remote units, the invention can be applied not only to a cordless telephone but also to a transceiver and an interphone system of a carrier wave type using a commercial AC power line.

As set forth above, according to the invention, when a single base unit is employed with more than one remote unit, a plurality of remote units can be placed in the talk mode simultaneously without radio interference so that a selected one of the remote apparatus can be correctly connected with the outside line.

Thus there is provided in accordance with the invention a novel and highly-effective apparatus for establishing radio communication between a base unit and a plurality of remote units without risk of radio interference. Many modifications of the preferred embodiment of the apparatus disclosed above will readily occur to those skilled in the art. For example, the frequencies employed, the number of handsets employed in combination with a single base unit, and the particular format employed to ensure that each of the particular codes can be periodically received by the base unit without interference caused by transmission of the other particular codes of the remote units can all be varied within wide limits. Accordingly, the invention is to be construed as including all structure withing the scope of the appended claims.

I claim:

1. Apparatus comprising a base unit and a plurality of remote units, said remote units being respectively adapted to establish radio communication at separate times with said base unit;

each of said remote units comprising:

means for generating a particular code in a particular format that includes at least one interval in which said particular code is present and at least one interval from which said particular code is absent, the particular code and particular format of each remote unit being different from those of the other remote units of said plurality of remote units, and means for transmitting said particular code in said particular format to said base unit;

said particular formats being such that the transmission of each of said particular codes periodically corresponds to non-transmission of all of the other particular codes of said plurality of remote units, whereby each of said particular codes can be periodically received by said base unit without interference caused by transmission of the other particular codes of said plurality of remote units;

said base unit comprising means for echoing the particular code transmitted by a selected one of said remote units; and each of said remote units further comprising means for detecting whether or not its own particular code matches said particular code echoed by said base unit;

and further comprising means responsive to such a match for establishing a communication channel between said base unit and the one of said plurality of remote units in which such match occurs, said communication channel while established precluding establishment of a communication channel between said base unit and any other of said plurality of remote units.

2. Apparatus according to claim 1; wherein each of said remote units is a cordless telephone.

3. Apparatus according to claim 2; wherein each of said remote units comprises means for generating an up channel audio signal, frequency modulator means responsive to said up channel audio signal for generating a frequency modulated up channel signal, and antenna means response to said frequency modulated up channel signal for transmitting said frequency modulated up channel signal to said base unit.

4. Apparatus according to claim 3; wherein each of said remote units further comprises control means for generating a code signal including said particular code and minimum shift keying modulating means response to said code signal for generating a modulated audio frequency code signal, said frequency modulator means being responsive to said modulated audio frequency code signal, whereby said audio frequency code signal is frequency modulated for transmission to said base unit.

5. Apparatus according to claim 4; wherein each of said remote units further comprises keying switch means connected to said control means for keying in the number of a third person to be called.

6. Apparatus according to claim 4; wherein each of said remote units further comprises talk switch means connected to said control means for selectively placing said control units in a standby mode or a talk mode.

7. Apparatus according to claim 4; wherein each of said remote units further comprises channel switch means connected to said control means for selecting one of a plurality of channels for communication with said base unit.

8. Apparatus according to claim 4; wherein each of said remote units further comprises first dip switch means connected to said control means for generating an identifying code unique to the combination of said base unit and said remote units.

9. Apparatus according to claim 4; wherein said means in each said remote units for generating said particular code comprises second dip switch means connected to said control means.

10. Apparatus according to claim 4; wherein said base unit comprises means for generating a down channel audio signal, frequency modulator means responsive to said down channel audio signal for generating a frequency modulated down channel signal, and antenna means responsive to said frequency modulated down channel signal for transmitting said frequency modulated down channel signal to said base units.

11. Apparatus according to claim 10; wherein said base unit further comprises control means for generating a code signal selectively including the particular code of one of said remote units or a code common to all of said remote units and minimum shift keying modulating means responsive to said code signal for generating a modulated audio frequency code signal, said frequency modulator means in said base unit being responsive to said modulated audio frequency code signal in said base unit, whereby said audio frequency code signal in said base unit is frequency modulated for transmission to said remote units.

12. Apparatus according to claim 11; wherein said base unit further comprises channel switch means connected to said control means in said base unit for selectively placing said base unit in one of a plurality of channels for communication with said remote units.

13. Apparatus according to claim 11; wherein said base unit further comprises third dip switch means connected to said control means in said base unit for generating an identifying code unique to the combination of said base unit and said remote units.

* * * * *